United States Patent [19]

Huggins

[11] 4,171,722
[45] Oct. 23, 1979

[54] HEAT RECOVERY SYSTEM

[75] Inventor: Homer D. Huggins, Racine, Wis.

[73] Assignee: Modine Manufacturing Company, Racine, Wis.

[21] Appl. No.: 765,089

[22] Filed: Feb. 3, 1977

[51] Int. Cl.² .............................................. F28F 19/00
[52] U.S. Cl. ................... 165/95; 126/299 D; 134/115 R; 134/183; 55/385 R; 55/DIG. 36; 165/119; 165/DIG. 12
[58] Field of Search .................. 165/166, 119, DIG. 2, 165/DIG. 12, 95; 34/86; 126/299 D, 299 E, 299 R; 134/104, 115 R, 183; 62/303; 55/DIG. 36, 385 R

[56] References Cited

U.S. PATENT DOCUMENTS

| 1,960,510 | 5/1934 | Ridgway | 165/DIG. 2 |
| 3,381,747 | 5/1968 | Darm | 165/DIG. 12 |
| 3,827,343 | 8/1974 | Darm | 126/299 D |
| 3,854,388 | 12/1974 | King | 55/DIG. 36 X |
| 4,040,477 | 8/1977 | Garberick | 165/DIG. 12 |

OTHER PUBLICATIONS

Ross Fume Incinerators, Data Sheet No. GF-900, Ross Engineering, Midland-Ross Corp., New Brunswick, NJ, 1973.

Primary Examiner—Albert W. Davis, Jr.
Attorney, Agent, or Firm—Wegner, Stellman, McCord, Wiles & Wood

[57] ABSTRACT

A heat recovery device for recovering waste heat from a hot gas that carries solid and precipitable contaminants of the type given off from the grill area of a fast food restaurant in which a heat exchanger is provided through which these gases are directed for heat exchange with a gas to be heated such as ambient air. The heated air may then be supplied to the interior of the restaurant or to ambient. The two gases are directed through sets of spaced passages in the heat exchanger in heat exchange relationship with each other. A filter is used ahead of the heat exchanger for filtering the hot gas. This filter is easily removed for cleaning. A liquid receiving container may be periodically used to replace the filter. This receives a liquid such as a hot detergent solution that may be used to clean the contaminated passages of the heat exchanger.

1 Claim, 5 Drawing Figures

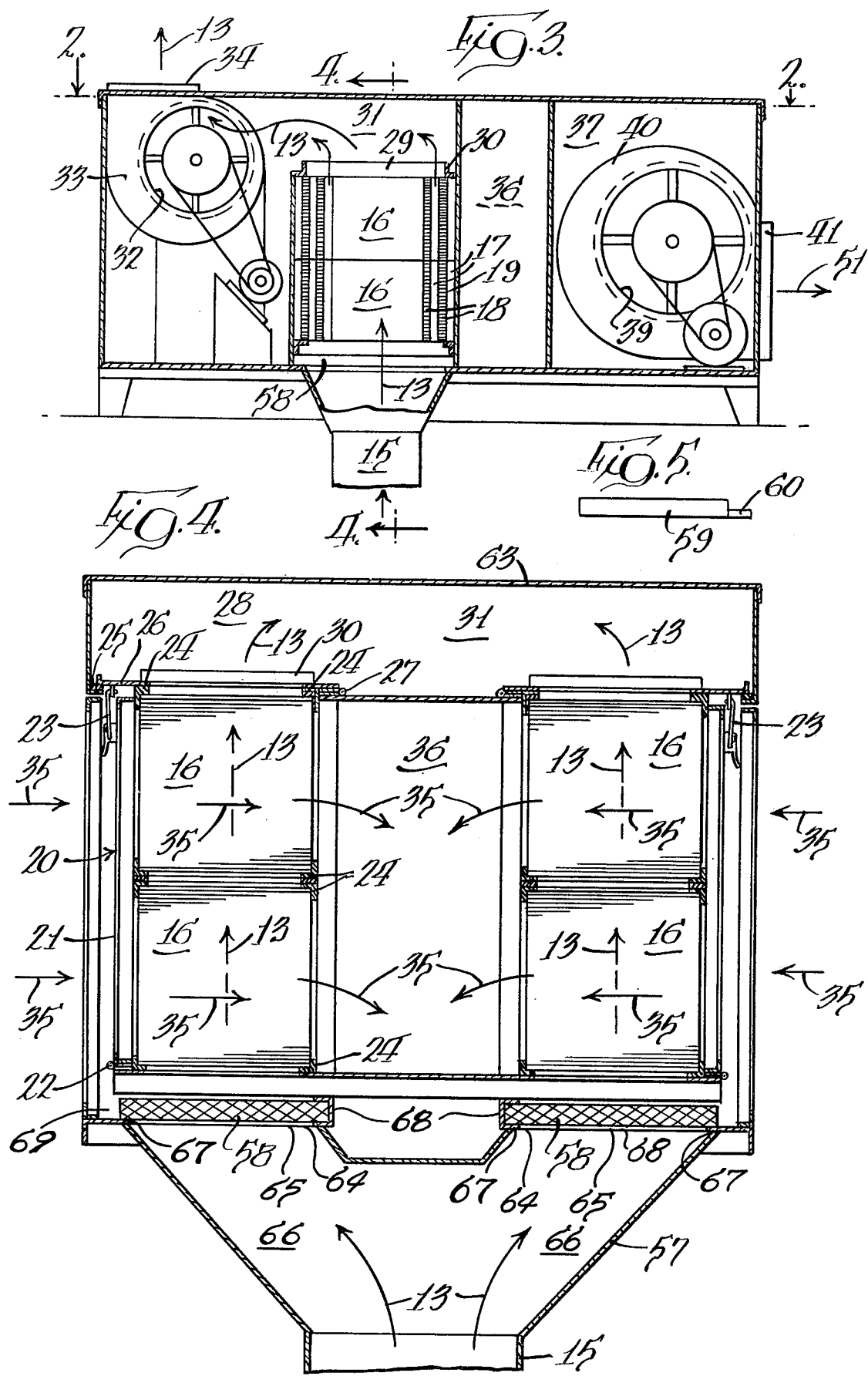

HEAT RECOVERY SYSTEM

BACKGROUND OF THE INVENTION

In many installations and particularly in fast food restaurants the grills, ovens and the like give off a considerable amount of waste heat which is customarily exhausted to a place of disposal. Attempts to recover this waste heat are complicated by the fact that the gases carry a large amount of grease, entrapped solid wastes and similar solid and precipitable contaminants. Therefore, the exhaust hot gas tends to clog filters, fans, ductwork and heat transfer surfaces. These precipitated and deposited contaminants not only clog up these devices and interfere with proper heat transfer but also require frequent shutdown because in general the disposal system for the gases containing these contaminants must be cleaned every few hours and particularly after peak rush periods such as after the main meal times.

In addition, many restaurants both of the fast food type and the more general type have water scrubbers installed above their exhaust hoods in an attempt to solve this problem of extracting much of the grease and other contaminants before the exhaust gas enters the fan and ductwork system of the exhaust devices. These water scrubbers are very satisfactory and reasonable, but they waste heat values from the exhaust hot gas. For example, when an exhaust gas stream from a grill area which contains considerable heat is subjected to the water spray the temperature of this exhaust gas is frequently reduced by as much as 20° F.

As an example, the exhaust temperatures from electric grills frequently are as much as 90° F., but after passing through the water scrubbers the temperature is reduced to 70° F. In some instances, this difference of 20° is of course wasted heat, as it is not recovered from the scrubbers and therefore the available heat in the resulting scrubbed gases is greatly reduced. From the energy conservation standpoint, it is of course much more desirable to extract waste heat from a 90° F., exhaust rather than a 70° F. exhaust from the water scrubbers.

The heat recovery device of the present invention permits removing the grease and other contaminants by filtering action without materially cooling the exhaust. The filter is easily cleaned. It also provides heat exchangers for recovering the heat with these heat exchangers also being easily cleaned. Furthermore, the device of this invention is versatile in selectively utilizing the air that is heated by recovered waste heat.

One of the features of this invention is to provide a heat recovery device having the above characteristics with the principal features being easy cleanability so that the contaminants can be readily removed as desired.

The invention will be described as related to the embodiment shown in the accompanying drawings.

BRIEF DESCRIPTION OF THE DRAWINGS

FIG. 3 is a vertical sectional view taken substantially along line 3—3 of FIG. 2.

FIG. 4 is a vertical sectional view taken substantially along line 4—4 of FIG. 3.

FIG. 5 is a side elevational view of a detail of the apparatus.

DESCRIPTION OF THE PREFERRED EMBODIMENT

Figure 1:
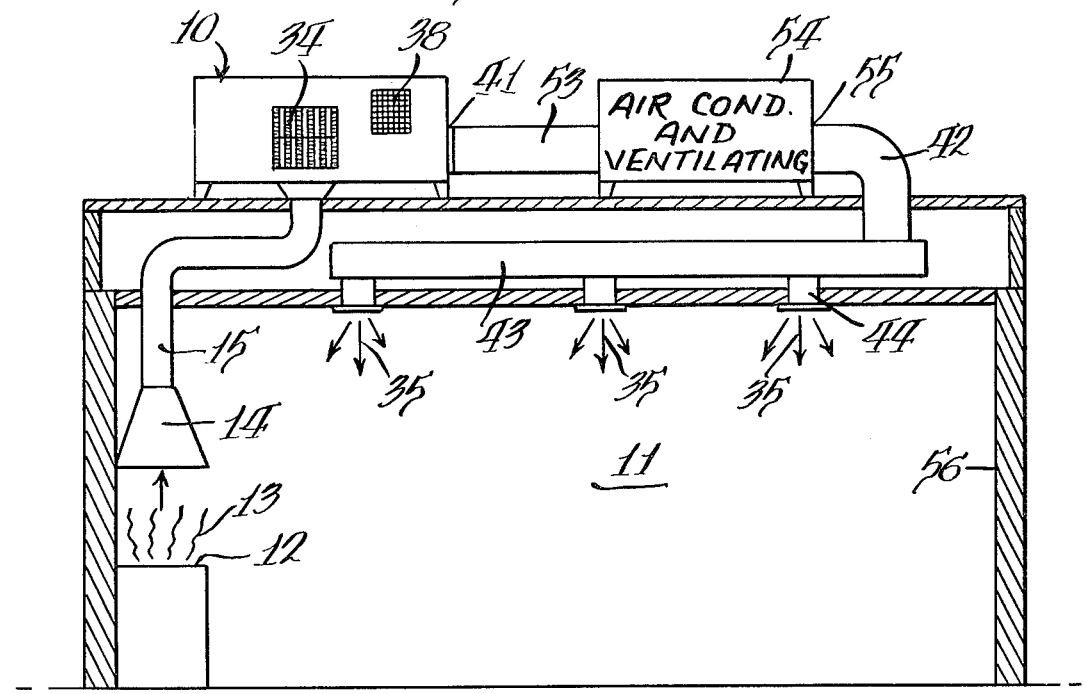
FIG. 1 is a semi-schematic sectional view of a fast food restaurant service unit embodying a heat recovery device according to the invention.
Figure 2:
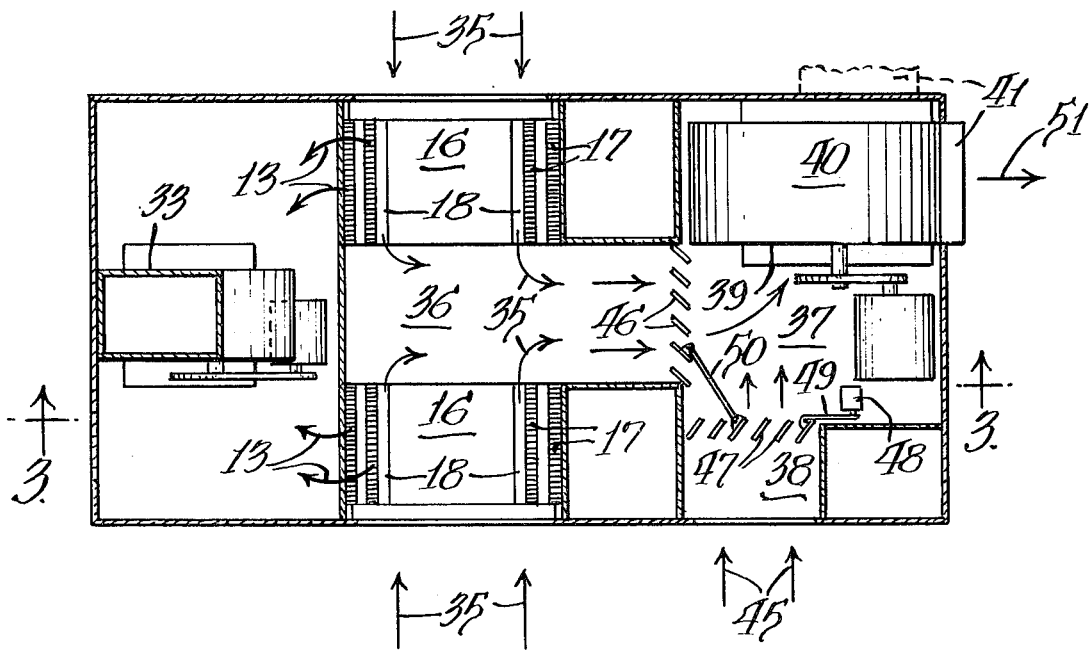
FIG. 2 is a horizontal sectional view taken substantially along line 2—2 of FIG. 3.

In the illustrated embodiment the heat recovery device 10 is shown in conjunction with a space 11 which may be the room of a fast food restaurant having a grill 12 that gives off a hot gas 13 which in the customary way is collected by a hood 14 from which leads a first conduit 15. This conduit 15 leads to the heat recovery device 10 which is placed at an external location to the room 11, as illustrated in FIG. 1. This device comprises a heat exchanger 16, although in the illustrated embodiment there are four of these heat exchangers 16 arranged in two vertically stacked pairs as shown in FIGS. 3 and 4.

Each of these heat exchangers has spaced vertical first passages 17 interleaved with spaced horizontal second passages 18 and each of the passages 17 and 18 contains a heat transfer fin 19 of the customary type.

Each pair of vertically stacked heat exchangers 16 as shown in FIG. 4 is releasably retained in a supporting frame 20 each of which has one side 21 hinged at the bottom by a hinge 22 and latched in place at the top by a pair of toggle latches 23. Each vertical pair of heat exchangers 16 is sealed to its respective frame by edge seals 24. The top exchanger 16 of each vertical pair is also sealed by the seals 24 and an outermost seal 25 to a cover plate 26 each of which is hinged at one edge as by a hinge 27 with the seal 25 sealing the edge of the plate 26 that is opposite the hinge 27 to the bottom of a duct 28.

Although not shown, each of the heat exchangers 16 may be provided with a pair of handles for easy removal and installation as desired. A heat exchanger mounting of this type is described and claimed in D. C. Granetzke copending application Ser. No. 758,129, filed Jan. 10, 1977 and assigned to the assignee hereof.

In the illustrated embodiment the hot gas 13 is collected by the hood and flows upwardly in the first conduit 15 and through the vertical first passages 17 in the two pairs of stacked heat exchangers 16 as illustrated in FIGS. 3 and 4. The gas 13 leaves the topmost heat exchanger 16 through an opening 29 in each of these heat exchangers with each top opening being surrounded by a flange 30 in the cover plate 26.

As can be seen in FIG. 4 the hot first gas 13 is divided into two streams at the top end of the first conduit or duct 15 for passage upwardly in parallel flow paths through the two pairs of stacked heat exchangers 16. These two separate streams are then remingled in a plenum chamber 31 at the top of the stacked heat exchangers and this duct is connected to the entrance 32 of a motor driven blower 33 having an exhaust 34 for exhausting the now cooled first gas 13 to a place of disposal such as the ambient.

The horizontal passages or second passages 18 of the stacked heat exchangers are open as illustrated in FIG. 1 by the opening 34 in the unit 10 to receive make-up air as by receiving air from ambient to provide fresh air to the restaurant space 11 occupied by the diners or, as desired, to exhaust a portion of it back to the ambient in a manner to be described hereinafter.

The second gas 35 although as illustrated is ambient air could, of course, be very well drawn from the space 11 in which instance it would be reheated by the waste heat in a recirculation path. However, in this embodiment, the make-up air 35 is heated in the four heat exchangers 16 in each of which the passages 17 and 18 are in heat exchange interleaved relationship with each other and arranged in cross flow relationship.

The make-up air passages 18 of all four heat exchangers empty into a second plenum chamber 36 which is located generally beneath the first plenum chamber 31. This second chamber 36 is provided with two conduits 37 and 38 with each subjected to suction by being connected to the entrance 39 of a gas pump or blower 40 which has an exhaust 41.

The conduit 38 is also connected to ambient (see FIG. 1) to provide air flow 45 into the suction blower 40. The proportions of the warmed make-up air 35 flowing through the plenum 36 and into the blower 40 and the unheated air 45 drawn into the conduit 37 are controlled by movable dampers 46 and 47 that are moved simultaneously by a customary electric motor 48 and linkages 49 and 50. With this arrangement when one set of dampers 46 or 47 is moved to open the other set is moved to close and as is true with dampers of this type they may be moved various degrees so as to proportion the amount of heated air flow 35 and unheated air flow 45 into the area 37 thereby regulating the temperature of the blower 40 exhaust air 51.

The exhaust 41 from the heat recovery device 10 is connected by a conduit 53 in the illustrated embodiment of an air conditioning and ventilating unit 54 whose exhaust 55 empties into ducts 42, 43 and 44 for supplying the heated air or second gas 35 to the space 11 within the room 56 which as stated may be a restaurant.

The heat recovery device 10 of this invention provides mechanical means for separating the contaminants including solid and precipitable contaminants. Thus the top 57 of the first conduit 15 carries at its upper end metal mesh filters 58.

As can be seen in the drawings, and particularly in FIG. 4, the top 57 of the first conduit 15 that conducts the hot first gas 13 to the heat exchanger is provided with a transverse open frame 64 that is open on the top and bottom to provide laterally spaced openings 65, each communicating with a side branch 66 of the first conduit top 57. Each bottom opening 65 is defined by a peripheral flange 67 extending around the sides of the frame 64. In addition, each frame 64 is bounded on its inner side by a U-shaped frame part 68. The extreme outer side of each frame 64 is open as shown at 69 in FIG. 4.

These frame 64 flanges 67 provide supports for the two metal mesh filters 58. Each of these filters is readily removable for cleaning by merely sliding it outwardly through the open side 69 or to the right or left as shown in FIG. 4. Each of the filters 58 is in open communication with a pair of stacked heat exchangers 16 so that the hot first gas 13 in its parallel paths readily passes upwardly through the filters 58 and through the corresponding pair of stacked heat exchangers 16 into the first plenum chamber 31 and from there into the exhaust blower 33. Thus the device 10 including the filters 58 permits the device to be used in a retrofit situation.

Another very important feature of this invention is the provision of removable drain pans illustrated at 59 in FIG. 5 each having a handle 60. When it is desired to clean the first gas passages 17 in the stacked heat exchangers 16 while leaving these heat exchangers in position the filters 58 may be removed as described and replaced by pans 59. Thus the pans 59 are also supported by the open frames 64. Then cleaning solution such as a hot liquid detergent solution may be sprayed over the heat exchangers 16 and the solution will flow down into the corresponding pans 59 for easy cleaning. In order to do this the removable lid 63 defining the upper surface of the duct 28 is removed so as to make the tops of the topmost heat exchangers readily available for the spraying. By using this technique for cleaning the heat exchangers 16 periodically the times that the heat exchangers must be removed for individual cleaning is greatly reduced.

As can be seen from this description, the heat recovery device of this invention permits recovering heat values from waste hot gas that carries solid and precipitable contaminants as from a restaurant grill and the like without materially reducing the temperature of the hot gas and yet removing these contaminants. Therefore, more of the heat value carried upwardly from the grill 12 is recovered to heat make-up air if desired.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A heat recovery device for recovering waste heat from a hot gas that carries solid and precipitable contaminants, comprising: two pairs of heat exchangers each having spaced essentially vertical first passages therethrough for said hot gas and spaced second passages therethrough for a cooler second gas to be heated by said hot gas, said passages being in heat exchange relationship with each other, said first and second passages comprising interleaved cross flow path means for said gases; heat transfer fin means in each said cross flow path means; first conduit means for said hot gas to said first passages, said first conduit means having a transverse open frame; second conduit means for said second gas leading to said second passages in said heat exchangers; third conduit means for removing said second gas from said second passages; a filter and contaminant separator unit in said first conduit at the entrance to said first passages; and means comprising said transverse open frame for mounting said filter and contaminant separator unit in said first conduit for ready removal from said first conduit and for alternately mounting a liquid receiving container in said first conduit for receiving cleaning liquid introduced into said first passages for periodic cleaning of said first passages of said heat exchangers of said solid and precipitated contaminants deposited in said first passages, each of said pairs of said heat exchangers being arranged for successive flow and with means for dividing said hot gas flow into a pair of streams each passing through a said pair of successive said heat exchangers, thereby permitting continuous operation through one pair while the other, out of service, pair is being cleaned.

* * * * *